Z. COOK.
Bench-Dogs.
No. 198,763. Patented Jan. 1, 1878.
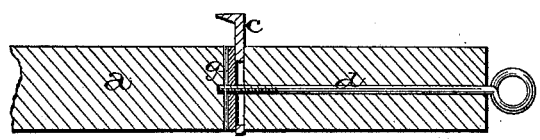
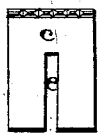
WITNESSES.
J. Wm Garner.
W. S. D. Haines.
INVENTOR.
Z. Cook
per
F. A. Lehmann,
Atty.

UNITED STATES PATENT OFFICE.

ZENAS COOK, OF INGERSOLL, MICHIGAN.

IMPROVEMENT IN BENCH-DOGS.

Specification forming part of Letters Patent No. 198,763, dated January 1, 1878; application filed December 4, 1877.

*To all whom it may concern:*

Be it known that I, ZENAS COOK, of Ingersoll, in the county of Clinton and State of Michigan, have invented certain new and useful Improvements in Bench-Dogs; and I do hereby declare the following to be a full, clear, and exact description of the invention, such as will enable others skilled in the art to which it pertains to make and use it, reference being had to the accompanying drawings, which form part of this specification.

My invention relates to an improvement in bench-dogs; and it consists in the arrangement and combination of devices, that will be more fully described hereinafter, whereby the dog can be raised upward to any desired extent, and then clamped in position, so as to suit the thickness of lumber that is being dressed or operated upon.

The accompanying drawings represent my invention.

*a* represents the top of a carpenter's bench, down through which is made a vertical slot. In this slot is placed a dog, *c*, which is slotted the greater part of its length, so as to allow the set-screw *d* to pass through it. This set-screw is passed through from the end of the table, so as to extend horizontally through a slot, *e*, in the dog, through the slot in the bench, and the clamping-nut *g*, which is placed in the slot in the bench, so as to clamp against the side of the dog.

By turning the screw in one direction the clamping-screw is loosened, so that the dog can be freely adjusted up or down, or entirely removed from the slot, and by turning the screw in the other direction the dog will be clamped rigidly in position whenever it is adjusted.

By making the slot all the way down through the lower end of the dog, it can be removed from the slot whenever it is desired without having to remove the screw and clamp.

The device here shown will be of great convenience to carpenters and others, and, owing to the fact that it is formed of three very simple parts, its cost is but a mere trifle.

Having thus described my invention, I claim—

In combination with the bench *a*, having a vertical slot, the dog *c*, screw *d*, and clamping-nut *g*, the dog being slotted, so as to be adjusted vertically, substantially as shown and described.

In testimony that I claim the foregoing I have hereunto set my hand and seal this 24th day of November, 1877.

ZENAS COOK. [L. S.]

Witnesses:
STEPHEN PEARL,
EDWARD J. STARK.